US012559250B2

(12) United States Patent　　　　　(10) Patent No.:　US 12,559,250 B2
Lellek et al.　　　　　　　　　　　　(45) Date of Patent:　　Feb. 24, 2026

(54) AIRCRAFT HAVING A FUEL CELL AND METHOD FOR OPERATING A FUEL CELL OF AN AIRCRAFT

(71) Applicant: MTU Aero Engines AG, Munich (DE)

(72) Inventors: Stephan Lellek, Garching (DE); Jan Hägert, Alling (DE)

(73) Assignee: MTU Aero Engines AG, Munich (DE)

( * ) Notice: Subject to any disclaimer, the term of this patent is extended or adjusted under 35 U.S.C. 154(b) by 35 days.

(21) Appl. No.: 18/568,642

(22) PCT Filed: May 19, 2022

(86) PCT No.: PCT/DE2022/100385
§ 371 (c)(1),
(2) Date: Dec. 8, 2023

(87) PCT Pub. No.: WO2022/258104
PCT Pub. Date: Dec. 15, 2022

(65) Prior Publication Data
US 2024/0294264 A1　　　Sep. 5, 2024

(30) Foreign Application Priority Data

Jun. 11, 2021　(DE) .......................... 102021115226.7

(51) Int. Cl.
*B64D 41/00*　　　(2006.01)
*B64D 27/34*　　　(2024.01)
(Continued)

(52) U.S. Cl.
CPC ........... *B64D 41/00* (2013.01); *B64D 27/355* (2024.01); *H01M 8/0265* (2013.01);
(Continued)

(58) Field of Classification Search
CPC ........ B64D 27/24; B64D 27/34; B64D 27/35; B64D 2041/00
See application file for complete search history.

(56) References Cited

U.S. PATENT DOCUMENTS

| | | | |
|---|---|---|---|
| 5,114,103 | A | 5/1992 | Coffinberry et al. |
| 2007/0117501 | A1 | 5/2007 | Solntsev et al. |

(Continued)

FOREIGN PATENT DOCUMENTS

| | | |
|---|---|---|
| DE | 746905 C | 12/1944 |
| DE | 4128078 A1 | 3/1992 |

(Continued)

OTHER PUBLICATIONS

Piancastelli, L., Frizziero, L., & Donnici, G. (2015). The Meredith Ramjet: An Efficient Way to Recover the Heat Wasted in Piston Engine Cooling.:, ARPN Journal of Engineering and Applied Sciences, vol. 10, No. 12, Jul. 2015.

(Continued)

*Primary Examiner* — Timothy D Collins
*Assistant Examiner* — Justin Michael Heston
(74) *Attorney, Agent, or Firm* — Davidson Kappel LLC

(57) ABSTRACT

An aircraft having a fuel cell (20) and an air supply device (30) for supplying air for operating the fuel cell (20) and for cooling a heat exchanger (21) connected to the fuel cell (20), the aircraft (1) having at least one air duct (10) whose cross section widens in the direction of flow (5) of the air downstream of an air inlet opening (11) in at least one region (35) of the peripheral surface. Also provided is a method for operating such a fuel cell (20) of an aircraft (1) with an air supply device (30) for operating the fuel cell (20) and for cooling a heat exchanger (21) connected to the fuel cell (20).

15 Claims, 2 Drawing Sheets

(51) Int. Cl.

| | |
|---|---|
| *B64D 27/355* | (2024.01) |
| *H01M 8/0265* | (2016.01) |
| *H01M 8/04007* | (2016.01) |
| *H01M 8/04111* | (2016.01) |

(52) U.S. Cl.
CPC .... *H01M 8/04067* (2013.01); *H01M 8/04111* (2013.01); *B64D 27/34* (2024.01); *B64D 2041/005* (2013.01)

(56) References Cited

U.S. PATENT DOCUMENTS

| | | | | |
|---|---|---|---|---|
| 2007/0298308 | A1 | 12/2007 | Yamamoto et al. | |
| 2009/0014593 | A1 | 1/2009 | Westenberger et al. | |
| 2011/0151763 | A1 | 6/2011 | Selchert et al. | |
| 2011/0300786 | A1 | 12/2011 | Kastell et al. | |
| 2016/0200447 | A1 | 7/2016 | Luedders et al. | |
| 2020/0075971 | A1 | 3/2020 | Lo et al. | |
| 2020/0277069 | A1* | 9/2020 | Rainville | B64U 50/18 |
| 2021/0078719 | A1* | 3/2021 | Thomas | B60L 50/71 |

| | | | | |
|---|---|---|---|---|
| 2022/0306306 | A1* | 9/2022 | Labarthe | F04D 25/0606 |
| 2022/0411083 | A1* | 12/2022 | Kierbel | H01M 8/004 |
| 2023/0159176 | A1* | 5/2023 | Taylor | B64D 27/355 |
| | | | | 244/55 |

FOREIGN PATENT DOCUMENTS

| | | | |
|---|---|---|---|
| DE | 10028450 | A1 | 4/2002 |
| DE | 10361657 | A1 | 8/2005 |
| DE | 102007023685 | B3 | 10/2008 |
| DE | 102008009274 | A1 | 8/2009 |
| DE | 102008002116 | A1 | 12/2009 |
| DE | 102007019820 | B4 | 3/2012 |
| DE | 102015100185 | A1 | 7/2016 |
| EP | 3043408 | A1 | 7/2016 |
| EP | 2998225 | B1 | 10/2017 |

OTHER PUBLICATIONS

Meredith:"Cooling of Aircraft Engines—With special reference to Ethylene Glycol Radiators enclosed in Ducts," Aug. 1935, Communicated by the Director of Scientific Research, Air Ministry, Reports and Memoranda No. 1683.

* cited by examiner

AIRCRAFT HAVING A FUEL CELL AND METHOD FOR OPERATING A FUEL CELL OF AN AIRCRAFT

The invention relates to an aircraft having a fuel cell and a method for operating a fuel cell of an aircraft with an air supply device for operating the fuel cell and for cooling a heat exchanger connected to the fuel cell.

BACKGROUND

Fuel cells mounted in aircraft generate large amounts of heat, which are dissipated via heat exchangers. Accordingly, the heat exchangers of fuel cells operated in aircraft, in particular when used to generate the motive power of the aircraft, are often disposed in an area through which air flows, such as the engine nacelle or within an air duct, and in such a way that ram air and/or downwash air can be used to cool at least one heat exchanger of the fuel cell(s). In this connection, an air flow is usually directed to at least one cooling surface of the heat exchanger in order to absorb heat energy from the heat exchanger. In order for fuel cells to operate, they need, in addition to a fuel, an oxidizing agent which, in the case of fuel cells used in aircraft, is usually provided by air or the oxygen contained therein, the air being compressed to achieve high efficiency of the fuel cell. The disadvantages of known air supply devices include the deterioration of the aerodynamics of the aircraft caused by devices for intake and conveyance of ram air and/or downwash air as well as the energy required for compressing the air before it is supplied to the fuel cell.

SUMMARY OF THE INVENTION

In view of the above, it is an object of the present invention to provide an improved aircraft having a fuel cell and an air supply device. Also provided is an improved method for operating a fuel cell of an aircraft with an air supply device. This is achieved in accordance with the invention by the teaching of the independent claims. Advantageous embodiments of the invention are the subject matter of the dependent claims.

The present invention provides an aircraft having a fuel cell and an air supply device for supplying air for operating the fuel cell and for cooling a heat exchanger connected to the fuel cell. The aircraft has at least one air duct whose cross section widens in the direction of flow of the air downstream of an air inlet opening in at least one region of the peripheral surface. The air duct has at least one flow-through opening in the at least one widening region of the peripheral surface, allowing air for operating the fuel cell to be drawn therethrough.

The invention relates to aircraft, such as in particular airplanes, helicopters, or also unmanned air vehicles, which have at least one fuel cell with a heat exchanger connected for cooling the fuel cell. The heat exchanger is configured to dissipate heat energy, for example, via cooling surfaces, in particular to the surroundings. An air flow passing over the cooling surfaces can absorb heat energy from the heat exchanger. "Fuel cell" refers to an electrochemical device that generates heat and electrical energy from a fuel and an oxidizing agent. Known fuel cells use, for example, hydrogen as a fuel and oxygen, particularly oxygen contained in the ambient air, as an oxidizing agent. Fuel cells are typically configured in the form of fuel cell stacks, which are referred to simply as "fuel cells" in the context of the description of the invention, based on common language usage.

The aircraft has at least one air duct with at least one air inlet opening, which is oriented at least substantially in the direction of flight of the aircraft in order to supply air from the surroundings of the aircraft to the air duct, especially during flight. The at least one air inlet opening is disposed at a suitable position on the outer skin of the aircraft, such as, in particular, on a fuselage or a wing. In particular, the air inlet opening is positioned such that ram air or downwash air is supplied therethrough to the air duct.

The air duct is configured such that its cross section widens in the direction of flow of the air downstream of the air inlet opening in at least one region of the peripheral surface. Accordingly, the air duct is configured in the manner of a diffuser, whereby the flow velocity of the air flowing through this section decreases, while at the same time the air pressure increases. The cross section of the air duct widens in at least one region of the wall, so that the wall widens in the at least one region, for example, at an opening angle inclined with respect to the longitudinal direction of the air duct. In at least one other region of the air duct cross section, the wall may at the same time have a larger or smaller opening angle, for example, or may be oriented parallel to the longitudinal direction of the air duct. In principle, the wall may also be configured to widen uniformly and/or, at least along one or more sections, rotationally symmetrically over the circumference thereof.

In the proposed design, the air duct has at least one flow-through opening in the at least one widening region of the peripheral surface, allowing air for operating the fuel cell to be drawn therethrough. In particular, the at least one flow-through opening is configured and disposed such that air flowing directly past or along the wall of the widening region of the peripheral surface is drawn therethrough. This is advantageous particularly in the case of regions widening at larger opening angles, where there is a risk of detachment of the boundary layer of the air flow. By drawing off the air that flows past the wall, it is possible to stabilize the ideally laminar boundary layer and to reduce the risk of detachment of the air flow. In particular, taking into account the flow conditions at the peripheral surface, one or more evenly or otherwise suitably distributed flow-through openings of the same or different size may therefore be arranged in a widening region of the peripheral surface.

The proposed configuration of the air duct with the widening cross section of the air duct downstream of the air inlet opening in at least one region of the peripheral surface creates a diffuser effect on the air flowing through the air duct, resulting in a reduction in the flow velocity and, at the same time, in an increase in pressure. Because the air pressure in the air duct increases downstream of an inlet opening, the air that can be drawn through the at least one flow-through opening is also at an elevated pressure, so that the energy required to compress the air supplied to the fuel cell for operating the same can be reduced accordingly. In this way, the proposed solution enables functional integration based on increasing the air pressure while at the same time reducing the air flow velocity in order to improve the cooling effect for the heat exchanger and the supply of compressed air to the fuel cell, and also to reduce the risk of air detachment from the wall in the widening region of the air duct.

In an embodiment of the aircraft, the heat exchanger is disposed in the widened cross section of the air duct. As already explained, the diffuser effect of the widening air duct upstream of the widened cross section of the air duct reduces the flow velocity of the air taken in while at the same time increasing the pressure. In this way, favorable air flow conditions can be achieved for the removal of heat energy from cooling surfaces of a heat exchanger disposed in the widened cross section of the air duct.

In an embodiment of the aircraft, the cross section of the air duct decreases in the direction of flow upstream of an air outlet opening. In this case, the cross section of the air duct decreases in at least one region of the peripheral surface. This tapered region of the air duct is disposed in particular downstream of the at least one heat exchanger. The cross section of the air duct decreases in at least one region of the wall, so that the wall tapers in the at least one region, for example, at a taper angle inclined with respect to the longitudinal direction of the air duct. In at least one other region of the air duct cross section, the wall may at the same time have a larger or smaller taper angle, for example, or may be oriented parallel to the longitudinal direction of the air duct. In principle, the wall may also be configured to taper uniformly and/or, at least along one or more sections, rotationally symmetrically over the circumference thereof. Accordingly, the air duct is configured in the manner of a nozzle, whereby the flow velocity of the air flowing through this section increases, while at the same time the air pressure decreases. The nozzle-like shape of the air duct upstream of an air outlet opening leads to an acceleration of the air flow and, thus, to an increased flow velocity of the outflowing air, resulting in an additional thrust for the aircraft.

In an embodiment of the aircraft, the air duct has at least one air feed opening for feeding exhaust air of the fuel cell into the air duct upstream of an air outlet opening. Thus, the exhaust air of the fuel cell is fed back into the air duct from which it was tapped. Moreover, additional heat enthalpy is thereby supplied to the air duct, which additionally increases the total enthalpy of the outflowing air upstream of the air outlet opening and, thus, further increases the thrust.

In an embodiment of the aircraft, the at least one flow-through opening is connected to an air supply duct for supplying the air to the fuel cell, in particular as an oxidizing agent for its operation, and/or for cooling the fuel cell. The air supply duct has a compressor device for compressing the air before it is supplied to the fuel cell. At the same time or alternatively, the compressor device may be provided for suctioning the air from the air duct through the flow-through opening. The air that can be drawn from the air duct through the flow-through opening is normally at an elevated pressure relative to the surrounding environment, in particular because of the diffuser effect in the region where the at least one flow-through opening is disposed. Depending on the boundary conditions (in particular ambient pressure, ambient temperature, flight speed, design of the air duct), the pressure differential between the air duct and the air supply duct to the fuel cell can already be sufficient to draw air from the air duct through the at least one flow-through opening. Especially when the pressure differential is not sufficient, a suitable pressure differential may be generated by the compressor device in order to supply a sufficient amount of air from the air duct to the fuel cell. In addition or alternatively, the air may in particular be further compressed by the compressor device before it is fed to the fuel cell in order to obtain a suitable pressure of the air for operating the fuel cell, in particular at a suitable efficiency.

In an embodiment of the aircraft, the fuel cell is part of the flight propulsion system. In this connection, the energy generated by the fuel cell may be the main prime mover of the flight propulsion system or complement it. In another embodiment of the aircraft, at least a portion of the energy generated by the fuel cell is provided to other than propulsion devices of the air vehicle, such as, for example, to devices for driving ancillary equipment, or to the on-board electrical system.

Another aspect of the invention provides a method for operating a fuel cell of an aircraft with an air supply device for operating the fuel cell and for cooling a heat exchanger connected to the fuel cell. The aircraft has at least one air duct whose cross section widens in the direction of flow of the air downstream of an air inlet opening in at least one region of the peripheral surface, in which region is disposed a flow-through opening for drawing air for operating the fuel cell.

The method includes the following steps:
a) passing air through the air inlet opening into the air duct;
b) compressing the air in the air duct downstream of the air inlet opening;
c) drawing compressed air from the air duct through the at least one flow-through opening;
d) conveying the air from the flow-through opening to the fuel cell;
e) directing the compressed air to at least one cooling surface of the heat exchanger; and
f) discharging the air from the air duct.

In a first step, air is passed through the air inlet opening into the air duct. Of course, the air inlet opening may also be multi-part. Typically, the air inlet opening is disposed in the direction of flight at a position of the aircraft that is particularly favorable for receiving ram air and/or downwash air, whereby sufficient air is passed into the air duct during a flight phase. Of course, it is also possible that additional devices, such as at least one fan wheel or the like, may be provided for passing air through the air inlet opening into the air duct.

In a further step, the air in the air duct is compressed downstream of the air inlet opening. The cross section of the air duct proposed for carrying out the method widens in the direction of flow of the air downstream of the air inlet opening in at least one region of the peripheral surface. Accordingly, the air duct is configured in the manner of a diffuser, whereby the flow velocity of the air flowing through this section decreases and, at the same time, the air pressure increases. Of course, it is also possible to provide additional devices in the air duct, in particular for further compressing the air.

In further steps, compressed air is drawn from the air duct through the at least one flow-through opening and supplied to the fuel cell. The at least one flow-through opening is configured and disposed such that air flowing directly past or along the wall of the widening region of the peripheral surface can be drawn therethrough. This makes it possible to stabilize the ideally laminar boundary layer at the wall of the air duct and to reduce the risk of detachment of the air flow in widening regions of the air duct.

In another step, the air that is drawn from the air duct through the at least one flow-through opening and is compressed, in particular by the diffuser effect in the air duct, is directed to at least one cooling surface of the heat exchanger. Due to the diffuser effect of the widening cross section of the air duct, the pressure of the air increases, but, at the same time, the flow velocity decreases, so that the proposed method additionally creates favorable flow conditions for heat absorption by the air when passing over cooling surfaces of the at least one heat exchanger. Finally, the air, which, during the execution of the method, has absorbed energy to generate an additional thrust, is discharged from the air duct, in particular into the surrounding environment.

The proposed method thus enables air to be supplied in an energetically favorable manner to at least one fuel cell for its operation and for cooling the heat exchanger connected to it. Depending on the design of the air duct, the method may also provide additional thrust for the aircraft.

In an embodiment of the method, the air is drawn through the at least one flow-through opening with the aid of suction, so that the air is suctioned through the at least one flow-through opening. This may be necessary particularly when the pressure differential at the at least one flow-through opening is not sufficient to draw a sufficient amount of air from the air duct. The suction may be generated in particular by a compressor device disposed in the air supply duct from the flow-through opening to the fuel cell.

An embodiment of the method includes, as an additional step, compressing the air conveyed from the flow-through opening to the fuel cell. This step, too, may be necessary particularly when the pressure of the air tapped from the air duct through the at least one flow-through opening is lower than necessary for supplying it to the fuel cell for its operation. The suction may be generated in particular by a compressor disposed in the air supply duct from the flow-through opening to the fuel cell. In particular, it is possible to use a common compressor device disposed, in particular, in the air supply duct for a combination of drawing the air through the at least one flow-through opening with the aid of suction and compressing the air supplied to the fuel cell.

An embodiment of the method includes, as an additional step, accelerating the air in the air duct downstream of the at least one heat exchanger. In this way, the air can provide additional thrust for the aircraft when subsequently discharged into the surrounding environment. Since a lower air flow velocity is advantageous for the absorption of heat energy from the heat exchanger, the air is advantageously accelerated only after heat energy has been absorbed from the heat exchanger. This acceleration may be effected, in particular, by a taper of the cross section of the air duct downstream of the heat exchanger. The energy enrichment of the air effected at the heat exchanger enables higher acceleration and flow velocity at the air outlet opening, thus making it possible to achieve additional thrust when the air is discharged into the surrounding environment.

An embodiment of the method includes, as an additional step, feeding the exhaust air from the fuel cell into the air duct downstream of the heat exchanger. The exhaust air of the fuel cell has an increased heat enthalpy as compared to the ambient air, so that by feeding the exhaust air into the air duct downstream of the heat exchanger, in particular in combination with an acceleration of the air in this section of the air duct, additional thrust can be provided when the air is discharged from the air outlet opening into the surrounding environment.

In an embodiment of the method for operating a fuel cell of an aircraft, the aircraft is configured according to at least one aspect of the aircraft described above. In particular, the aircraft may have one or more features and properties of the aforedescribed aircraft, in particular for carrying out the proposed method.

Since the proposed aircraft and the proposed method are based on a common basic idea, the illustrated features and properties of the proposed aircraft and of the proposed method constitute also mutual features and properties for at least optional embodiments of the aircraft and of the method and should therefore also be regarded as disclosed for the mutual aspects, respectively.

BRIEF DESCRIPTION OF THE DRAWING

Further features, advantages, and possible applications of invention will be apparent from the following description taken in conjunction with the drawings, in which.

DETAILED DESCRIPTION

Figure 1:
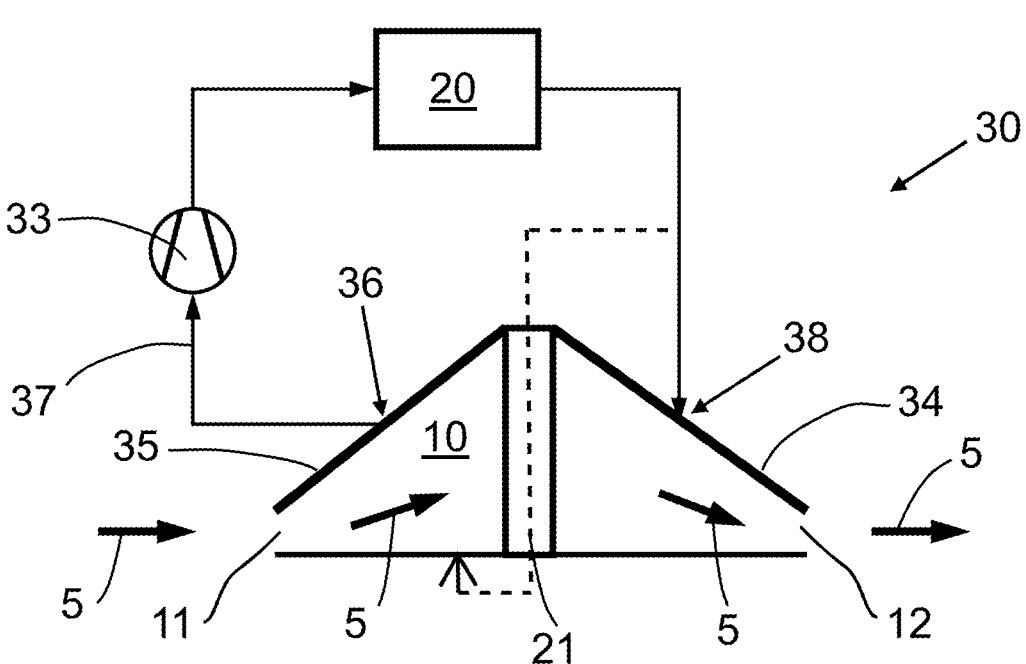
FIG. 1 is a schematic view of an air supply device of an exemplary aircraft according to the invention.

FIG. 1 shows in schematic form an air supply device 30 of an exemplary aircraft according to the invention. Air supply device 30 is connected to a fuel cell 20 for supplying air thereto for its operation. The cooling of fuel cell 20 is accomplished by a heat exchanger 21 disposed in an air duct 10. The cross section of the air duct widens in the direction of flow 5 of the air downstream of an air inlet opening 11 in a region 35 of the peripheral surface. Moreover, air duct 10 has a flow-through opening 36 in the at least one widening region 35 of the peripheral surface, allowing air to be supplied therethrough to fuel cell 20 for its operation by way of an air supply duct 37. Air supply duct 37 has a compressor device 33 for compressing the air before it is supplied to fuel cell 20 and/or for suctioning the air from air duct 10 through flow-through opening 36.

In the schematic view of FIG. 1, heat exchanger 21 is disposed in the widened cross section of air duct 10. The cross section of air duct 10 decreases in the direction of flow 5 downstream of heat exchanger 21 and upstream of air outlet opening 12 in at least one region 34. In tapered region 34, air duct 10 has an air feed opening 38 for feeding exhaust air of fuel cell 20.

Figure 2:
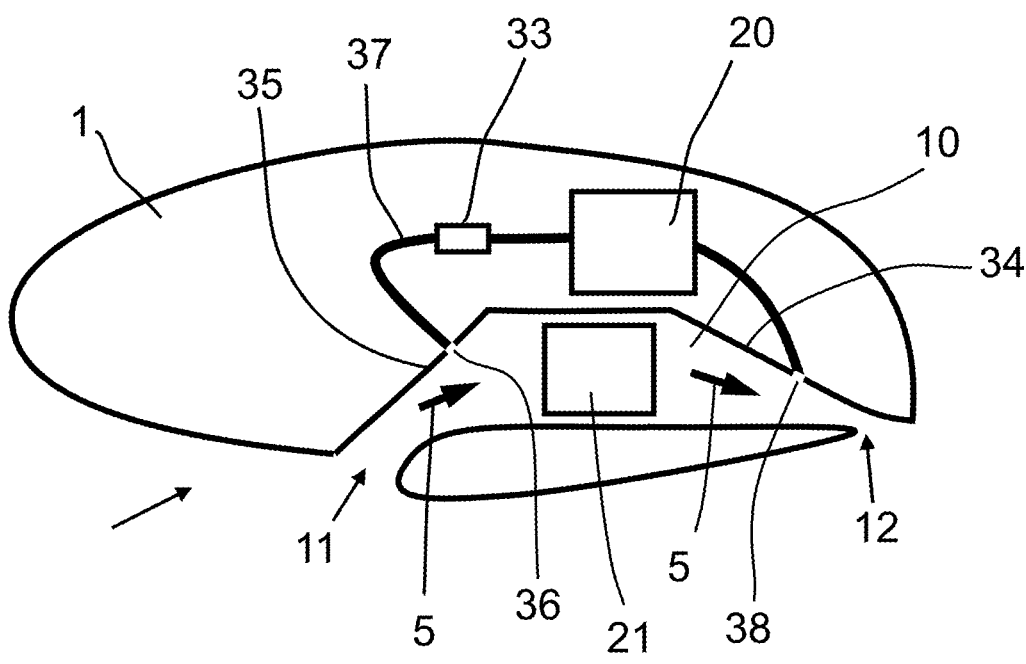
FIG. 2 is a schematic view showing a portion of an exemplary aircraft according to the invention.

FIG. 2 shows in schematic form a portion of an exemplary inventive aircraft 1 in a cross-sectional view through an air duct 10. Aircraft 1 has a fuel cell 20 and an air supply device 30 for supplying air for operating fuel cell 20 and for cooling a heat exchanger 21 connected to fuel cell 20. Aircraft 1; i.e., air supply device 30, has at least one air duct 10 whose cross section widens in the direction of flow 5 of the air downstream of an air inlet opening 11 in at least one region 35 of the peripheral surface. Air duct 10 has at least one flow-through opening 36 in the at least one widening region 35 of the peripheral surface, allowing air for operating fuel cell 20 to be drawn therethrough. The fuel cell 20 of the exemplary embodiment forms a part of the flight propulsion system of aircraft 1.

In the illustrated exemplary embodiment of the proposed aircraft 1, heat exchanger 21 is disposed in the widened cross section of air duct 10. The cross section of air duct 10 decreases in the direction of flow 5 downstream of heat exchanger 21 and upstream of air outlet opening 12 in at least one region 34. In the decreasing region 34, air duct 10 has at least one air feed opening 38 for feeding exhaust air of fuel cell 20.

The at least one flow-through opening 36 is connected to an air supply duct 37 for supplying the air to fuel cell 20, a compressor device 33 being disposed in air supply duct 37 for compressing the air before it is supplied to fuel cell 20 and/or for suctioning the air from air duct 10 through flow-through opening 36.

Figure 3:
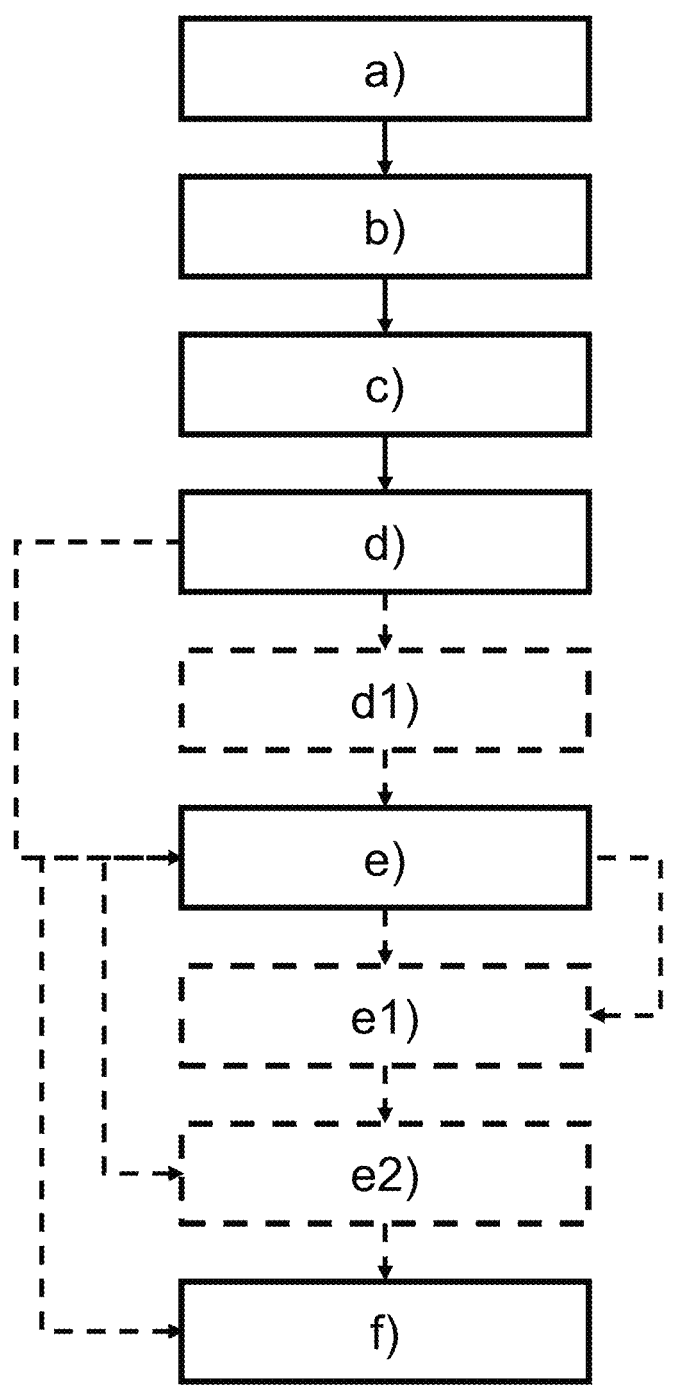
FIG. 3 is a schematic flow chart of the method according to the invention.

FIG. 3 shows a schematic flow chart of the inventive method for operating a fuel cell 20 of an aircraft 1. An exemplary embodiment of such an aircraft is illustrated, for example, in FIG. 2. Aircraft 1 has an air supply device 30 for operating a fuel cell 20 and for cooling a heat exchanger 21 connected to fuel cell 20. Aircraft 1 further has at least one air duct 10 whose cross section widens in the direction of flow 5 of the air downstream of an air inlet opening 11 in at least one region 35 of the peripheral surface, in which region is disposed a flow-through opening 36 for drawing air for operating fuel cell 20.

In a first step a), air is passed through air inlet opening 11 into air duct 10, and, in a second step b), the air in air duct 10 is compressed downstream of air inlet opening 11, for example, by means of a diffuser effect created in the air duct. In a third step c), compressed air is drawn from air duct 10 through a flow-through opening 36 and, in a next step d), is supplied to fuel cell 20.

In an optional step d1), the air conveyed from flow-through opening 36 to fuel cell 20 is compressed. This step is performed in particular when the pressure of the air tapped from the air duct through the at least one flow-through opening is lower than necessary for supplying it to the fuel cell for its operation.

In a next step e), the air compressed in air duct 10 downstream of air inlet opening 11 is directed to at least one cooling surface of heat exchanger 21 in order to absorb heat energy from heat exchanger 21 and dissipate it from there.

In a further optional step e1), the air in air duct 10 is accelerated after it has passed over heat exchanger 21 in order that the air can provide additional thrust for aircraft 1 when subsequently discharged into the surrounding environment. In yet another optional step e2) shown solely schematically by the dotted line in FIG. 1, the exhaust air from fuel cell 20 is fed into air duct 10 after passage over heat exchanger 21, whereby additional mass and enthalpy are added to the air flow, thereby also making it possible to provide an additional thrust when the air is discharged from air outlet opening 12 into the surrounding environment.

Finally, in a further step f) of the proposed method, the air is discharged from air duct 10, in particular through air outlet opening 12. In particular, during the execution of method, the air has absorbed energy to generate an additional thrust, which is available for the propulsion of aircraft 1, depending on the position and design of air outlet opening 12.

LIST OF REFERENCE NUMERALS 1 aircraft
5 direction of flow
10 air duct
11 air inlet opening
12 air outlet opening
20 fuel cell
21 heat exchanger
30 air supply device
33 compressor device
34 decreasing region of the peripheral surface of the air duct
35 widening region of the peripheral surface of the air duct
36 flow-through opening
37 air supply duct
38 air feed opening
What is claimed is:
1. An aircraft comprising:
a fuel cell;
an air supply for supplying air for operating the fuel cell and for cooling a heat exchanger connected to the fuel cell; and at least one air duct with a cross section widening in a direction of flow of air downstream of an air inlet opening in at least one widening region of a peripheral surface, the air duct having at least one flow-through opening in the at least one widening region of the peripheral surface, allowing air for operating the fuel cell to be drawn therethrough;
the at least one flow-through opening directing the air away from the widening region to the fuel cell, the fuel cell being located separately from the heat exchanger.

2. The aircraft as recited in claim 1 wherein the heat exchanger is disposed in the at least one widening region of the air duct.

3. The aircraft as recited in claim 1 wherein the cross section of the air duct decreases in the direction of flow upstream of an air outlet opening.

4. The aircraft as recited in claim 3 wherein the fuel cell is located separately from the heat exchanger.

5. The aircraft as recited in claim 1 wherein the air duct has at least one air feed opening for feeding exhaust air of the fuel cell into the air duct upstream of an air outlet opening.

6. The aircraft as recited in claim 1 wherein the at least one flow-through opening is connected to an air supply duct for supplying the air to the fuel cell, the air supply duct being connected to a compressor device for compressing the air before supply to the fuel cell or for suctioning the air from the air duct through the flow-through opening.

7. The aircraft as recited in claim 1 wherein the fuel cell is part of a flight propulsion system.

8. The aircraft as recited in claim 1 wherein the cross section of the air duct decreases in the direction of flow upstream of an air outlet opening to define a decreasing region of the peripheral surface, the heat exchanger being located between the widening region and the decreasing region.

9. The aircraft as recited in claim 1 wherein the fuel cell is located exteriorly to the widening region and the decreasing region.

10. The aircraft as recited in claim 1 wherein the fuel cell is spaced from the heat exchanger by the air duct.

11. A method for operating a fuel cell of an aircraft with an air supply for operating the fuel cell and for cooling a heat exchanger connected to the fuel cell, the aircraft having at least one air duct with a cross section widening in the direction of flow of air downstream of an air inlet opening in at least one widening region of the peripheral surface, a flow-through opening for drawing air for operating the fuel cell being disposed in the widening region, the method comprising the steps of:
a) passing air through the air inlet opening into the air duct;
b) compressing the air in the air duct downstream of the air inlet opening;
c) drawing compressed air from the air duct through the at least one flow-through opening;
d) conveying the air from the flow-through opening to the fuel cell;
e) directing the compressed air to at least one cooling surface of the heat exchanger; and
f) discharging the air from the air duct;
the cross section of the air duct decreasing in the direction of flow upstream of an air outlet opening to define a decreasing region of the peripheral surface, the method further comprising the step of directing exhaust air from the fuel cell to the decreasing region.

12. The method as recited in claim 11 wherein the air is drawn through the at least one flow-through opening with the aid of suction.

13. The method as recited in claim 11 further comprising the step of:

d1) compressing the air conveyed from the flow-through opening to the fuel cell.

14. The method as recited in claim 11 further comprising the step of:

e1) accelerating the air in the air duct downstream of the heat exchanger.

15. An aircraft comprising:

a fuel cell;

an air supply for supplying air for operating the fuel cell and for cooling a heat exchanger connected to the fuel cell; and at least one air duct with a cross section widening in a direction of flow of air downstream of an air inlet opening in at least one widening region of a peripheral surface, the air duct having at least one flow-through opening in the at least one widening region of the peripheral surface, allowing air for operating the fuel cell to be drawn therethrough;

the cross section of the air duct decreasing in the direction of flow upstream of an air outlet opening to define a decreasing region of the peripheral surface, the heat exchanger being located between the widening region and the decreasing region.

* * * * *